United States Patent [19]
Emond et al.

[11] Patent Number: 5,698,278
[45] Date of Patent: Dec. 16, 1997

[54] SMOOTH BORE HOT TAR AND ASPHALT HOSE

[75] Inventors: Jacques Bernard Emond; Andre George Cook, both of Granby, Canada

[73] Assignee: The Goodyear Tire & Rubber Company, Akron, Ohio

[21] Appl. No.: 716,702

[22] Filed: Sep. 20, 1996

[51] Int. Cl.$^6$ ............................................. F16L 11/08
[52] U.S. Cl. ..................... 428/34.5; 428/35.8; 428/35.9; 428/36.2; 428/36.3; 428/36.8; 428/36.9; 428/36.91; 428/465; 138/127; 138/133
[58] Field of Search ................... 428/35.8, 35.9, 428/36.3, 36.8, 36.91, 36.2, 36.92, 36.9, 34.5, 492, 465; 138/129, 131, 132, 133, 140, 141, 143, 144, 174, 126, 127

[56] References Cited

U.S. PATENT DOCUMENTS

| | | | |
|---|---|---|---|
| 3,989,067 | 11/1976 | Gates, Jr. | 428/36.8 |
| 4,157,101 | 6/1979 | Ross | 138/133 |
| 4,402,346 | 9/1983 | Cheetham et al. | 428/35.9 |
| 4,587,145 | 5/1986 | Kanao | 428/36.8 |
| 4,652,475 | 3/1987 | Haney et al. | 428/36.91 |
| 4,734,305 | 3/1988 | Sugimoto et al. | 428/36.8 |
| 4,806,351 | 2/1989 | Sugimoto et al. | 428/36.8 |
| 5,182,147 | 1/1993 | Davis | 428/36.91 |
| 5,348,779 | 9/1994 | Igarashi | 428/36.8 |

*Primary Examiner*—Rena Dye
*Attorney, Agent, or Firm*—Marc R. Dion, Sr.

[57] ABSTRACT

A hose having an inner tube layer comprised of an elastomeric layer having embedded therein a screen mesh and a wire helix.

4 Claims, 3 Drawing Sheets

SMOOTH BORE HOT TAR AND ASPHALT HOSE

FIELD

This invention relates to hose suitable for transferring hot tar and asphalt.

BACKGROUND

Prior hot tar and asphalt hoses were constructed with an inner layer of a rectangular helix wire, a layer of fabric reinforcement radially outward therefrom and a layer of elastomer tube which was resistant to the hot tar and asphalt located radially outward from the fabric. These three layers were considered the tube over which a carcass of various layers of fabric and/or wire reinforcement and other elastomeric layers were built. This type of hose, when used to transfer hot tar and asphalt in suction and discharge services, was subjected to thermal stresses which eventually would separate the tube from the carcass. In addition, the internal presence of the rectangular helix resulted in pumping inefficiencies.

SUMMARY OF THE INVENTION

In accordance with the practice of the present invention, there is provided a tube for a hot tar and asphalt transfer hose comprising:

an elastomeric layer having embedded therein a layer of screen mesh and a wire helix radially outward of the screen. The wire helix, while providing support for the tube is non-reinforcing for the hose in which the tube is used.

There is also provided a hose comprising:

a. an inner tube layer;

b. at least one layer of fabric reinforcement;

c. a layer of wire reinforcement embedded in an elastomeric medium;

d. at least one layer of a second fabric reinforcement; and e. a cover layer; wherein the inner tube layer is comprised of an elastomeric layer having embedded therein a layer of screen mesh and a wire helix radially outward of the screen.

DETAILED INVENTION

Figure 1:
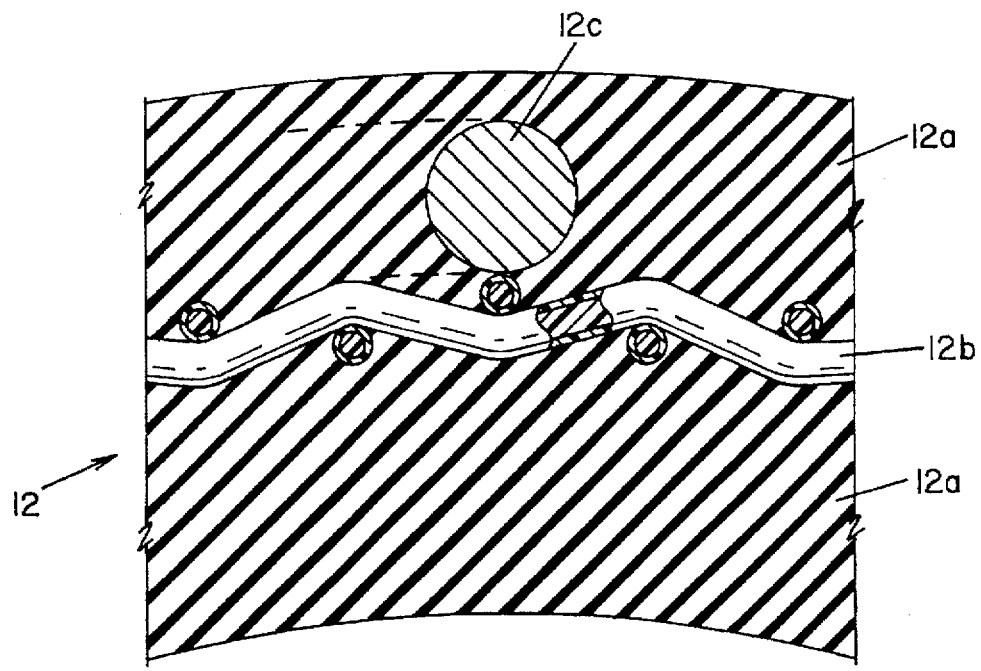
FIG. 1 is a sectional view of the tube of the invention taken along line 1—1 of FIG. 2.
Figure 2:
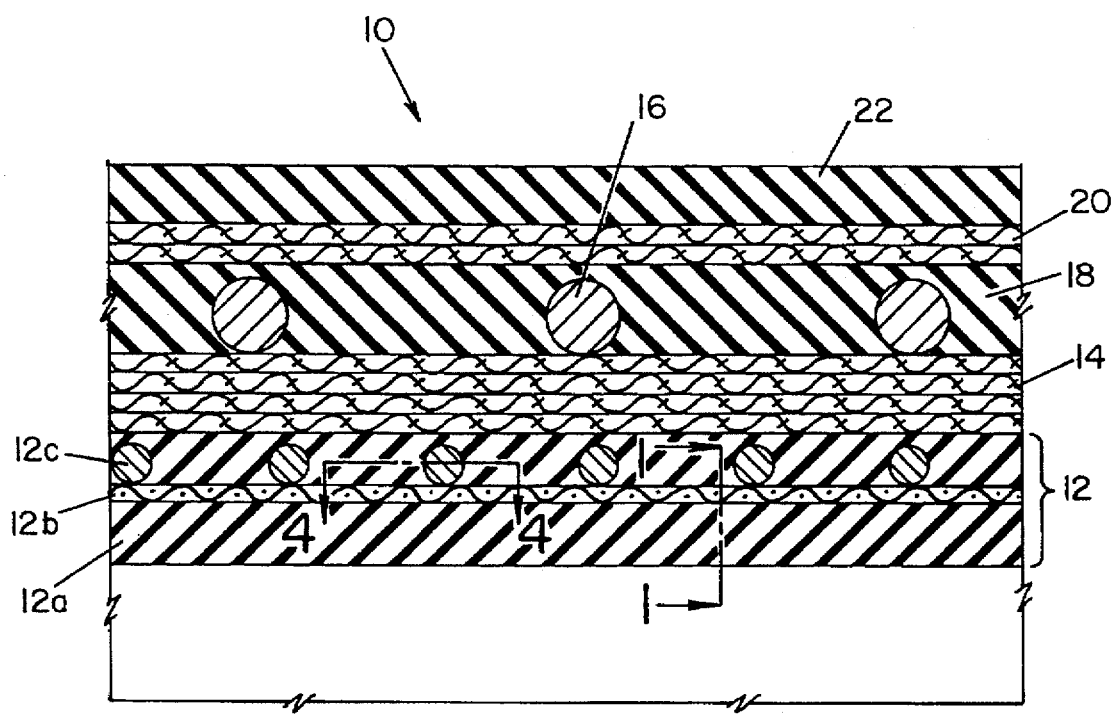
FIG. 2 is a longitudinal cross-sectional view of the hose of the invention.
Figure 3:
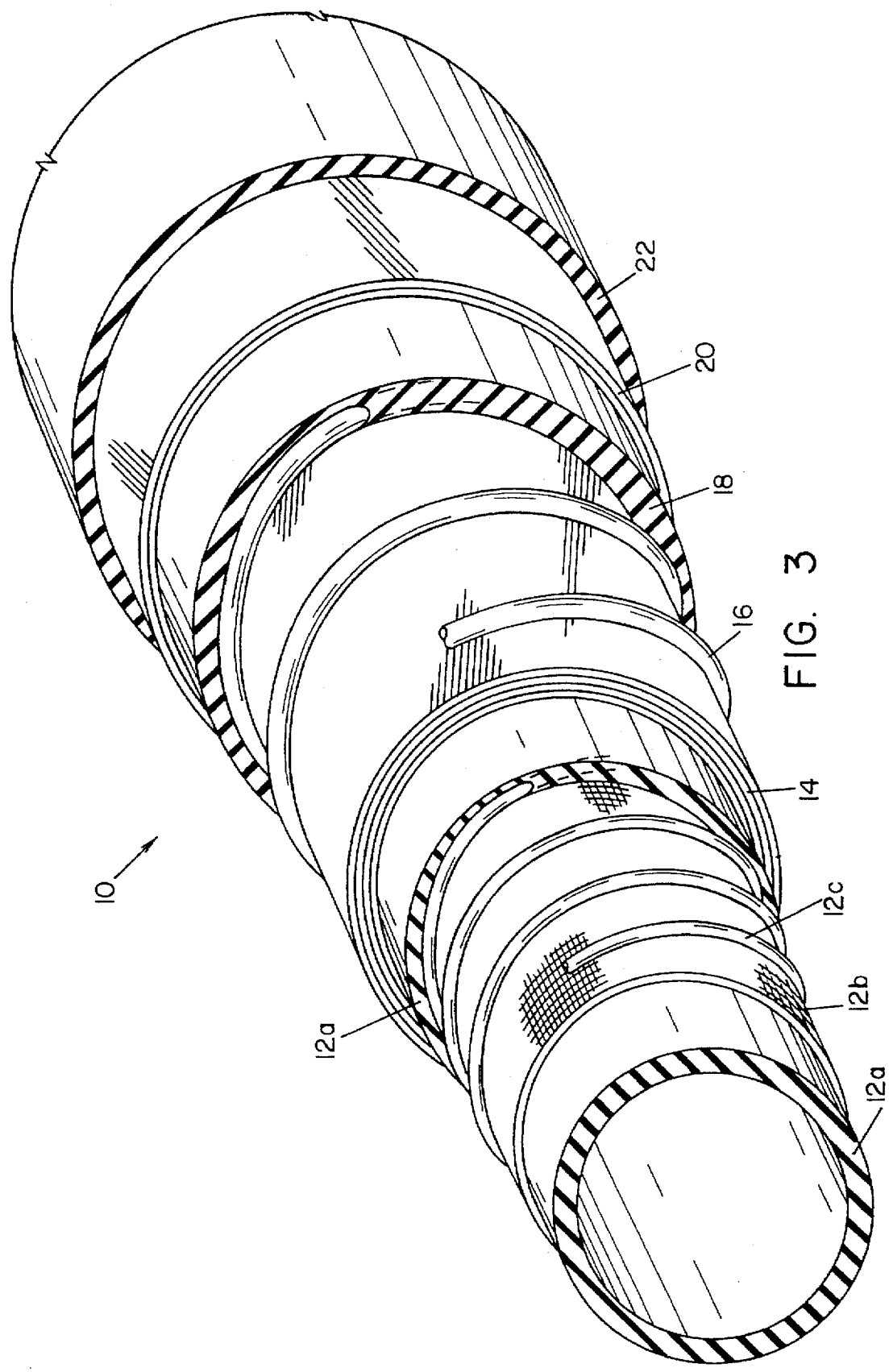
FIG. 3 is a perspective view of the hose of the invention with portions cut away.

The inner tube layer 12 of the hose shown generally at 10 is comprised of an elastomeric layer 12a which is resistant to hot tar and asphalt made with any oil and heat resistant elastomer such as NBR, CSM, FKM, etc. Embedded in the elastomeric layer (12a) are a layer of screen mesh (12b) and a wire helix (12c).

Figure 4:
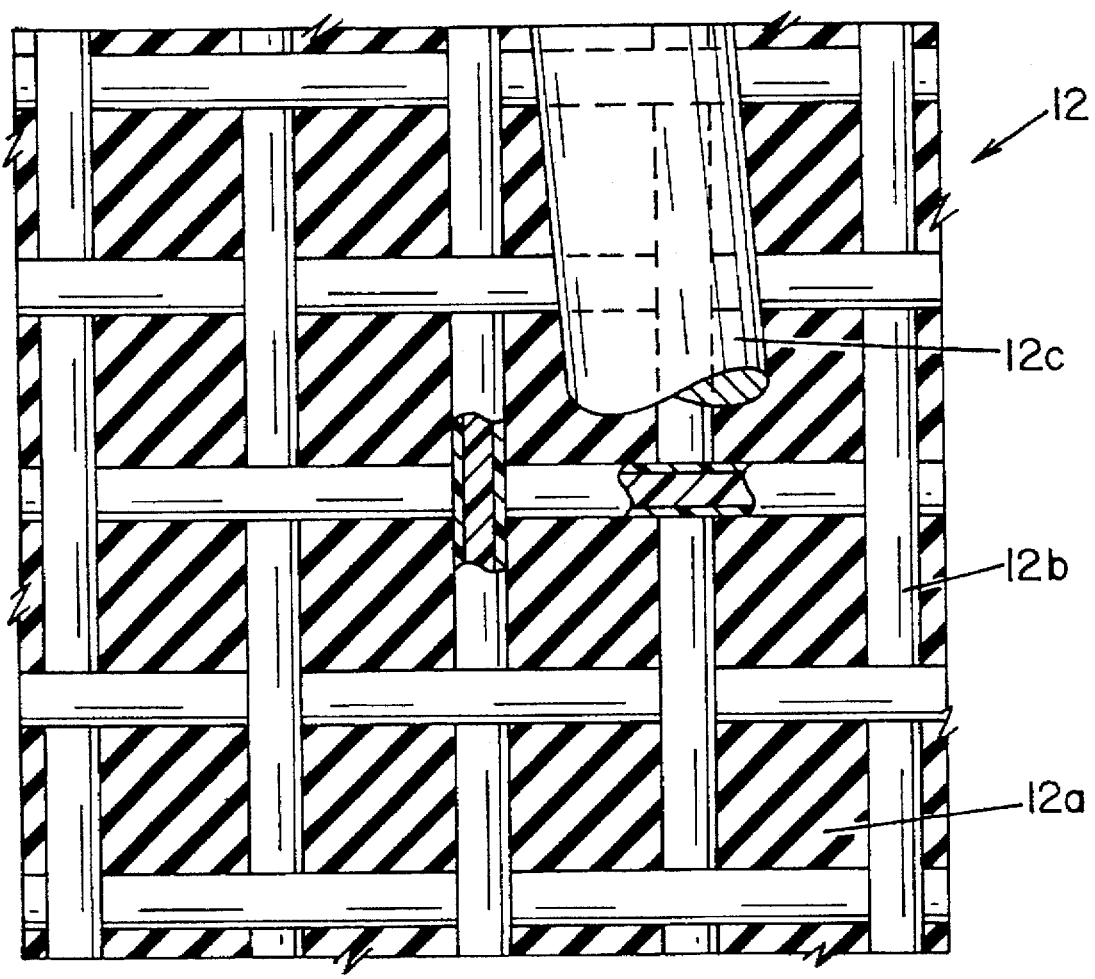
FIG. 4 is a diagrammatic sectional view of the wire helix and screen mesh taken along line 4—4 of FIG. 2.

The screen mesh (12b) can be made from any material which can withstand thermal stresses of the hot tar and asphalt environment. The preferred screen mesh is made from fiberglass which has been coated with polyvinylchloride and woven into a screen as illustrated in the enlarged view of FIG. 4.

The wire helix (12c) which is non-reinforcing, can have a diameter of 1.0 to 2.5 mm and is generally made of steel.

This inner tube layer (12) forms the basis over which the remaining carcass of a hose can be built including fabric reinforcement (14) made from tire cord or square woven fabric from various fibres such as nylon, polyaramide, polyester, etc.

At least one layer of wire reinforcement (16) of a diameter of 5–7 mm embedded in an elastomeric medium (18) which may be the same or different from elastomeric layer (12a).

Next, a second layer of fabric reinforcement (20) is followed by a cover layer (22) of such an elastomer to withstand the wear and environment in which the hose is to be used.

While certain representative embodiments and details have been shown for the purpose of illustrating the invention, it will be apparent to those skilled in this art that various changes and modifications may be made therein without departing from the spirit or scope of the invention.

What is claimed is:

1. A hot tar and asphalt hose comprising an inner tube layer comprising an elastomeric layer having embedded therein a screen mesh and a wire helix located radially outward from the screen mesh.

2. A hose comprising;

a. an inner tube layer;

b. at least one layer of a first fabric reinforcement;

c. a layer of wire reinforcement embedded in an elastomeric medium;

d. at least one layer of a second fabric reinforcement; and e. a cover layer; wherein the inner tube layer is comprised of an elastomeric layer having embedded therein a layer of a screen mesh and a wire helix radially outward of the screen.

3. The hose of claim 2 wherein the screen mesh is fiberglass coated with polyvinylchloride.

4. The hose of claim 3 wherein the wire helix has a diameter from 1.0 to 2.5 mm.

* * * * *